United States Patent [19]
Murai et al.

[11] Patent Number: 5,835,183
[45] Date of Patent: Nov. 10, 1998

[54] RIMLESS SPECTACLES

[75] Inventors: Masaru Murai, Fukui; Isao Hyoi, Sakai-Gun, both of Japan

[73] Assignee: Murai Co., Ltd., Fukui-Ken, Japan

[21] Appl. No.: 956,617

[22] Filed: Aug. 19, 1997

Related U.S. Application Data

[63] Continuation of Ser. No. 204,399, Jun. 30, 1994, abandoned.

[30] Foreign Application Priority Data

Jul. 17, 1992 [JP] Japan .................................. 4-213798

[51] Int. Cl.$^6$ ...................................................... G02C 1/02
[52] U.S. Cl. ........................ 351/110; 351/106; 351/135
[58] Field of Search ........................ 351/41, 65, 110, 351/111, 126, 129, 135, 144, 147, 149, 152, 178, 106

[56] References Cited

U.S. PATENT DOCUMENTS

| | | | |
|---|---|---|---|
| 943,085 | 12/1909 | Lawrence | 351/135 |
| 2,240,725 | 6/1941 | Styll | 351/149 |
| 5,073,020 | 12/1991 | Lindberg et al. | 351/110 X |

FOREIGN PATENT DOCUMENTS

| | | |
|---|---|---|
| 2645 | 6/1912 | United Kingdom. |
| WO87/04806 | 8/1987 | WIPO. |

*Primary Examiner*—Huy Mai
*Attorney, Agent, or Firm*—Anderson, Kill & Olick, P.C.

[57] ABSTRACT

Spectacles including a plurality of clamp members for connecting lens supporting parts of the spectacles to the lenses, and elements for increasing friction resistance between a lens contacting portion of a clamp member and respective surfaces of the lens.

20 Claims, 10 Drawing Sheets

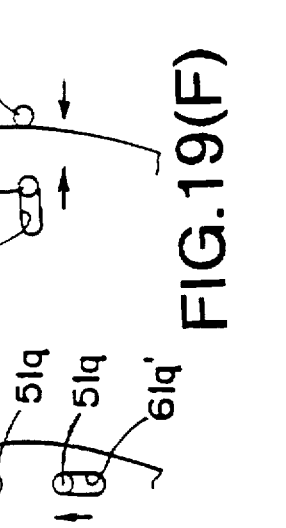
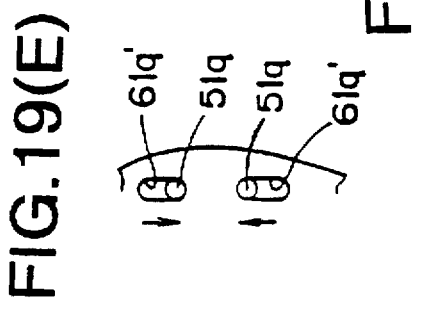
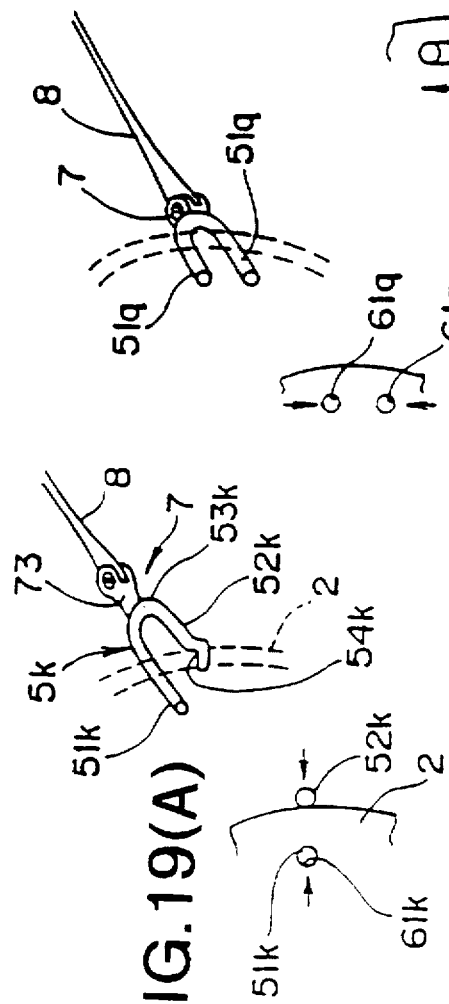

RIMLESS SPECTACLES

This is a continuation of application Ser. No. 08/204,399 filed Jun. 30, 1994 now abandoned.

TECHNICAL FIELD OF THE INVENTION

The present invention relates to a spectacle in which spectacle parts are directly attached to lenses without utilizing any fastening means such as screws.

BACKGROUND ART

One example of such conventional spectacle is disclosed for example in the Japanese Utility Model Laid-open Publication No. HEI 4-61311. That is, in a known spectacle of this kind, fitting portions or parts having elastic and springy property are formed to end portions of a bridge, an end plate, a pad and the like constituting a spectacle part, and such elastic fitting parts are fitted into holes formed to the lenses and fixed thereto.

In this known art, however, the elastic fitting parts are fitted and fixed to the holes of the lenses by applying pressure, so that the formation of relatively large holes to the lenses are required, thus providing a problem on design.

Furthermore, if the hole is not formed exactly, in the case of small fitting force, there is a fear of disengaging the spectacle parts from the lenses and, on the contrary, in the case of large fitting force, there is a fear of damaging or breaking the lenses. The requirement of the exact working performance will result in worse productivity.

An object of the present invention is to solve such problems as those encountered in the prior art and to provide a spectacle having spectacle parts directly attached to the lenses capable of reducing limitations on the spectacle design and producing the spectacle with relatively low working performance.

SUMMARY OF THE INVENTION

To achieve the above object, the present invention is characterized in that according to the present invention, there is provided a spectacle having lenses which are supported by a spectacle part other than a rim, which is characterized in that the lenses are directly supported by a clamp means clamping the lenses.

Here, the term "clamp" including snapping and supporting functions, in both cases, one in which a force is applied in the clamp means closing direction to thereby snap the lens and other in which a force is applied to the clamp means opening direction and acting a reaction force of the lens to snap the clamp means.

According to the present invention, the lens is clamped only by the clamp means, so that a precise hole forming working, as in the conventional technique, is not required.

It is preferred that the clamp means is provided with an elastic means for pressing the lens contacting portion of the clamp means against the lens by utilizing the springy elastic property.

However, it may be possible to utilize the bonding, fusing or calking means for the lens contacting portion of the clamp means without applying the elastic force.

It is also preferred to effect a work to the lens contacting portion of the clamp means for increasing friction resistance.

The working for increasing the friction resistance may be made by making coarse at least one of the contacting surfaces of the clamp means and the lens, forming an irregular surface or applying other frictioning material between the contacting surfaces.

Furthermore, a buffer means for buffering the force transferred from the spectacle part to the lens may be provided between the clamp means and the spectacle part. According to this location, an excessive force is prevented from being applied to the lens and the damage or breaking of the clamp means and the lens can be prevented.

A lens portion clamped by the clamp means is formed to a portion between the lens edge portions or between clamping force receiving portions formed to the lens.

The clamp means may have a structure for clamping the lens from its front and rear surface sides.

It is desired to form the clamping force receiving means as a recess such as hole formed to the lens. It may be possible to form the clamping force receiving means as a protrusion formed to the lens.

The clamp means is provided with a plurality of clamp pieces. It is preferred that at least one of the clamp pieces is endowed with a springy elastic property.

Such a structure may be adapted as that in which the lens is clamped by a clamp piece engaged with the clamping force receiving means formed to the lens and a clamp piece engaged with the edge portion of the lens.

It is effective to form a groove to the edge of the lens with which the clamp piece is engaged.

It may be possible to be provided with a plurality of clamp pieces to be engaged with a plurality of clamping force receiving portions formed to the lens to thereby clamp a lens portion between the clamping force receiving portions.

It is preferred that the clamping force receiving portion formed to the lens is a hole into which the clamp piece is inserted and fitted.

It is also preferred that there is provided a positioning means for positioning the clamp piece.

The clamp means comprises a pair of clamp pieces connected at one ends thereof so as to provide substantially U-shape, and the clamp means may be fitted to the lens from the rear side of the lens with the opened end side of the clamp pieces directed forward or from the front side of the lens with the opened end side thereof directed rearward.

As the spectacle part, an end member, a temple, a bridge, a pad leg or a hinge means may be utilized.

Figure 3A:
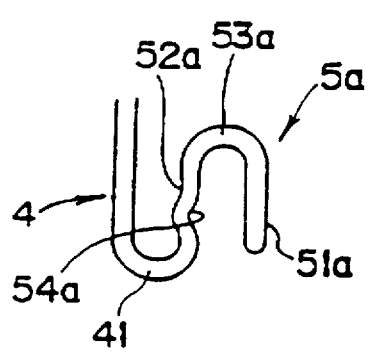
Figure 3B:
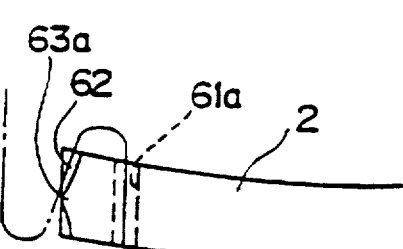
Figure 3C:
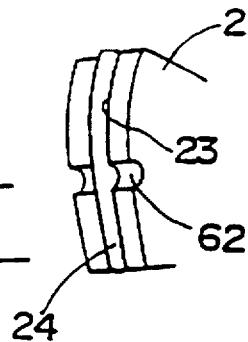
Figures 5A, 5B, 5C:
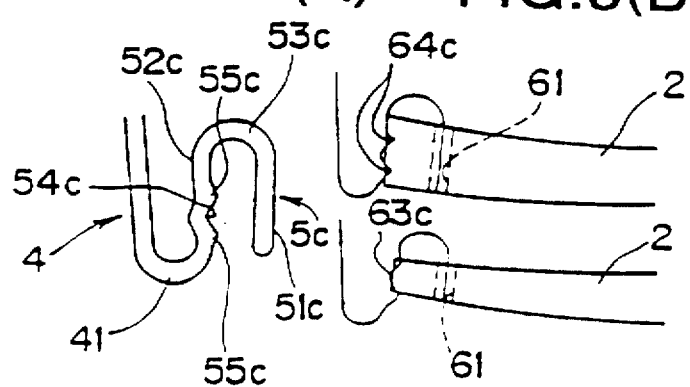
Figure 5D:
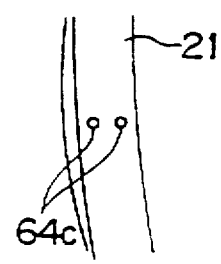
Figure 12A:
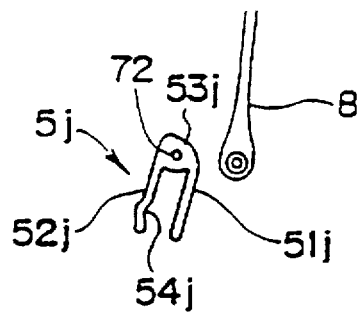
Figure 12B:
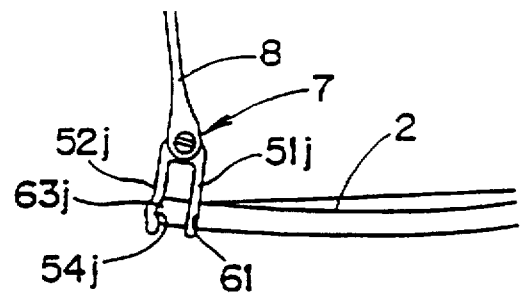
Figure 13:
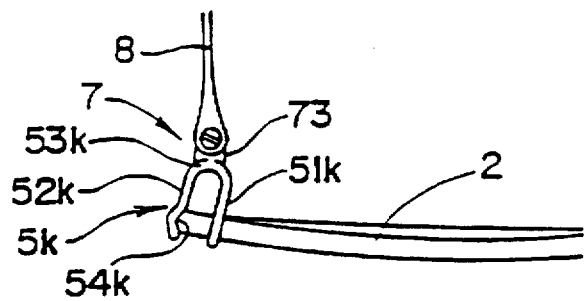
Figures 21A, 21D:
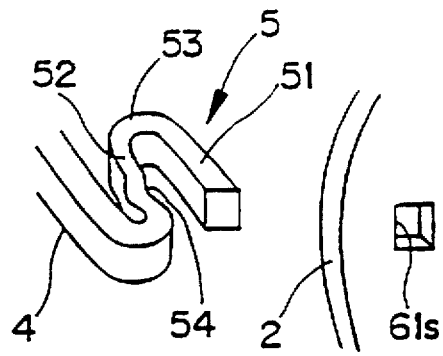
Figures 21B, 21E:
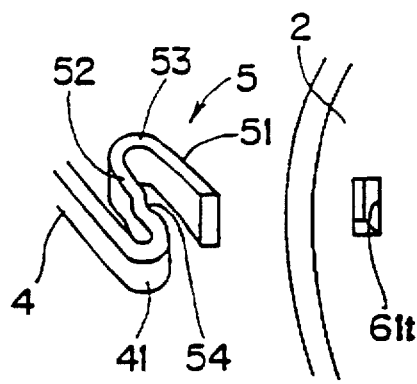
Figures 21C, 21F:
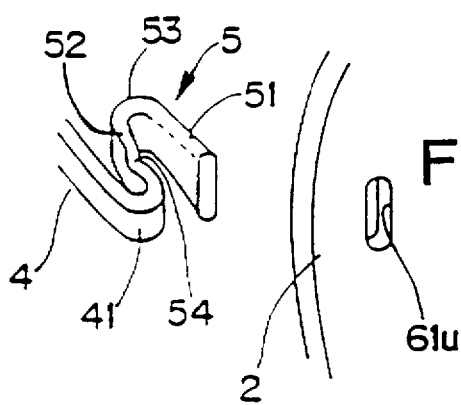

FIG. (2) is a developed view of a lens with clamping members according to the present invention;

FIG. 3(A) is a front view of a modified clamp member according to the present invention;

FIG. 3(B) is a schematic view showing the attachment of the modified clamp member to a lens;

FIG. 3(C) is a partial schematic view showing an auxiliary member for use with a still further modified clamp member shown in FIG. 3(A);

FIGS. 4(A)–11(A) and 14(A)–15(A) are front views of further modifications of a clamp member according to the present invention;

FIGS. 4(B)–11(B) and 14(B)–15(B) are schematic views showing the attachment of the modifications of a clamp member shown in FIGS. 4(A)–12(A) to a lens;

FIG. 5C is a schematic view showing attachment of a further modified clamp member to a lens;

FIG. 5D is a schematic view showing attachment of the clamp member shown in FIG. 5C to an outer edge of the lens;

FIG. 12(A) is a front view of a still further modification of a clamp member according to the present invention to which a hinge element is applied;

FIG. 12(B) is a schematic view showing the attachment of the clamp member shown in FIG. 12(A) to a lens;

FIG. 13 is a schematic view showing a still further modification of a clamp member according to the present invention to which a hinge element is applied;

FIGS. 16(A)–18(A) and 16(B)–18(B) are side and front views, respectively, of elastic clamp members according to the present invention designed in conformity with the types of the respective end members;

FIGS. 19(A)–19(G) and 20(A)–20(C) are views Showing clamping force directions for different structures of the elastic clamp members;

FIGS. 21(A)–21(C) are perspective views of three embodiments of clamp members according to the present invention; and FIGS. 21(D)–21(F) are views showing a shape of an opening formed in a lens for receiving the clamps shown in FIGS. 21(A)–21(C), respectively.

DETAILED DESCRIPTION OF THE PREFERRED EMBODIMENTS

One preferred embodiment of spectacles according to the present invention will be first described with reference to FIGS. 1(A)–1(D) and 2, in which a spectacle is denoted by reference numeral 1 which includes two lenses 2 to which a bridge 3 and end members 4 are directly attached as spectacle parts without using any fastening means such as screws, and lenses 2 are supported without using a rim.

The end members 4 are attached to both sides of the lenses and have rear ends attached to temples 8 through hinge members 7. A first clamp member 5 having an elastic property is provided to the distal front end of the end member 4, the first clamp member 5 being bent so as to provide substantially U-shape. This first elastic clamp member 5 is fixed to the lens 2 by clamping a first fixing portion 6 of the lens 2 formed to an outer edge side of the lens 2.

The first fixing portion 6 is formed with a lens portion between a hole 61 formed to the lens surface as a lens holding means and an outer edge 21 of the lens 2. The first elastic clamp member 5 is composed of a first clamp piece 51 which is to be fitted into the hole 61 and a second clamp piece 52 engaging with the outer edge 21 of the lens 2. These first and second clamp pieces 51 and 52 are integrally connected with each other through a connecting piece 53, and in the illustrated embodiment, the connecting piece 53 is positioned to the rear side of the lens 2. It is not necessary to form the hole 61 as a through hole, and it may be formed as a recessed portion or, in a certain case, it may be formed as a protruded portion.

Accordingly, only the end of first clamp piece 51, fitted into the hole 61, of the first elastic clamp member 5 is exposed to the front side of the lens 2. The end member 4 is connected to the second clamp piece 52 through a connecting portion 41 which is further bent so as to provide a U-shape, and accordingly, the structure including the end member 4 and the first elastic clamp member 5 provides entirely substantially S-shape. This connecting portion 41 attains function for alleviating a force from transferring from the temple side to the first clamp member 5, thus preventing the lenses 2 from applying an excessive stress or force.

A groove 62 is formed to the outer edge 21 of the lens 2 with which the second clamp piece 52 of the first clamp member 5 is engaged.

The bridge 3 is provided with second elastic clamp members 15, at its both end portions, which are to be fixed to second fixing portions 16 formed to inner edge sides of the lenses 2.

An hole 161 is formed to the lens 2 at the inner edge side of the lens 2 and the second fixing portion 16 is formed with a lens portion between the hole 161 and an inner edge 22 of the lens 2. The second elastic clamp member 15 is composed of a first clamp piece 151 which is to be fitted into the hole 161 and a second clamp piece 152 engaging with the inner edge 22 of the lens 2. These first and second clamp pieces 151 and 152 constitute opposing portions of the U-shaped second clamp member 5 and connected with each other through a connecting piece 153. The connecting piece 153 is positioned to the rear side of the lens 2, and accordingly, only the end of first clamp piece 151, fitted into the hole 161, of the second elastic clamp member 15 is exposed to the front side of the lens 2.

A groove 162 is formed to the inner edge 22 of the lens 2 with which the second clamp piece 152 of the second clamp member 15 is engaged. It is therefore necessary for the groove 162 to be formed to a portion corresponding to the second clamp piece 152 and to have a size therefor.

In assembling the spectacle of this embodiment, first with reference to the first elastic clamp member 5, the first clamp piece 51 of the first elastic clamp member 5 provided at the front end of the end member 4 is inserted into the hole 61 of the lens 2 and the second clamp piece of the clamp member 5 is then engaged with the groove 62 formed to the outer edge of the lens 2 to thereby clamp the first fixing portion 6 of the lens 2 by the first and second clamp pieces of the first elastic clamp member 5. The clamping force is due to the springy property of the first elastic clamp member 5. This assembling working is of course done to both the lenses 2 in the same manner.

Next, regarding the bridge 3, first clamp pieces 151 of the second clamp members 15 provided at both the end portions of the bridge 3 are inserted into the holes 161 formed to the inner edge sides of the lenses 2 and the second clamp pieces 152 are then engaged with the grooves 162 formed to the inner edges of the lenses 2. According to these manners, spectacles are assembled.

Figure 1A:
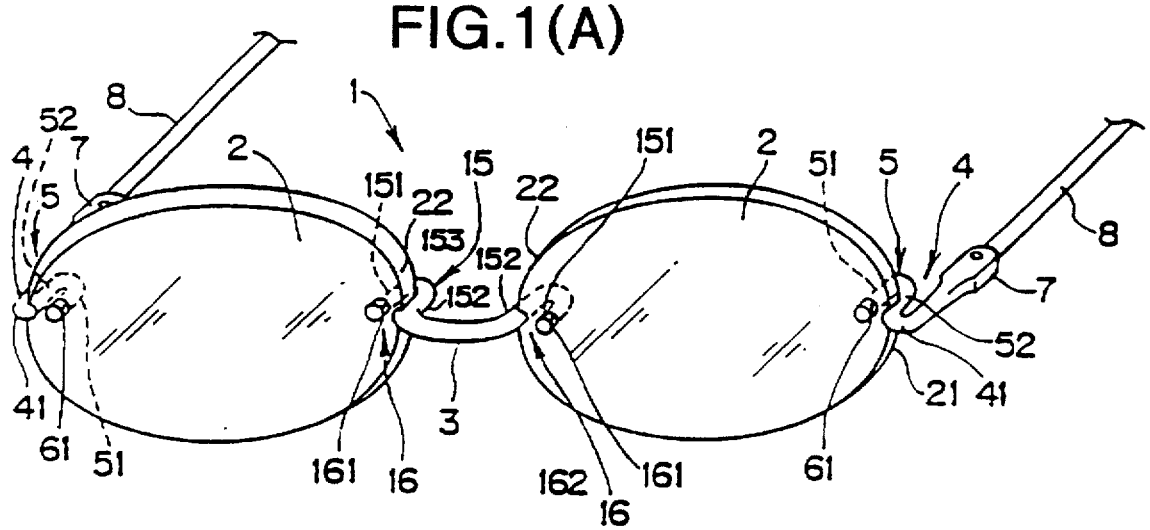
FIG. 1(A) is a general perspective view of spectacles according to The present invention.
Figure 1B:
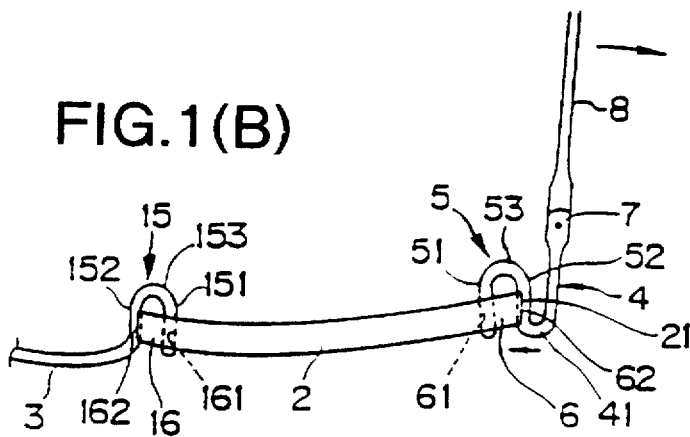
FIG. 1(B) is a partial plan view of the spectacles shown in FIG. 1A.
Figure 1D:
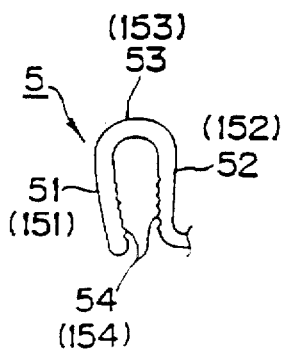
FIG. 1(D) is a front view of a lens with a modified elastic clamp member according to the present invention.
Figure 1C:
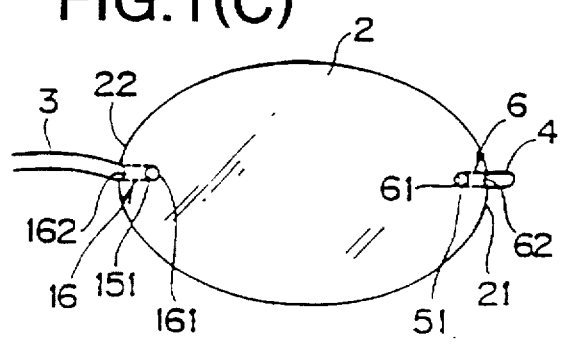
FIG. 1(C) is a front view of a clamp member for the spectacles shown in FIG. 1A.
Figure 2:
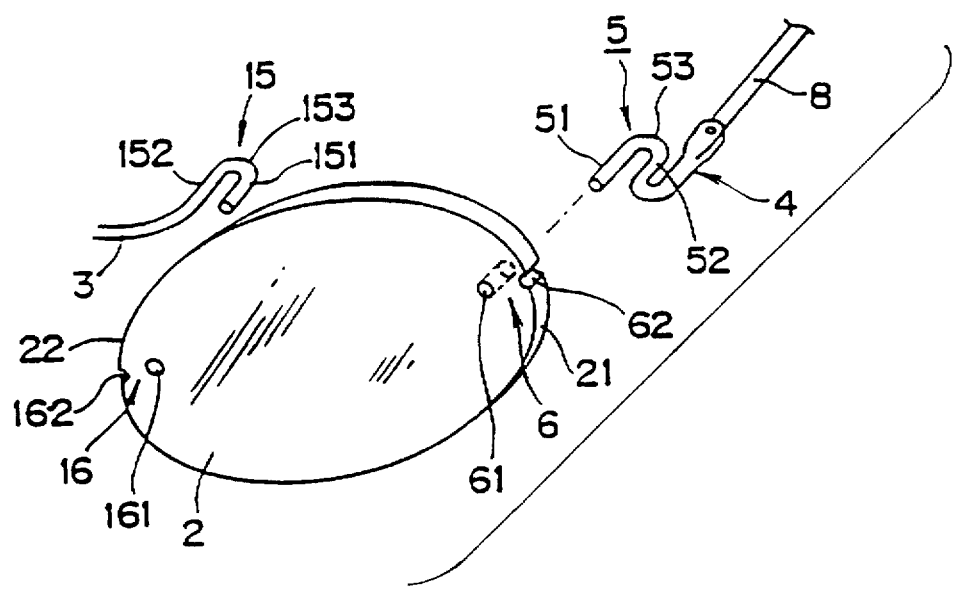

As shown in FIG. 1D, the first and second clamp pieces 51 and 151 of the first and second elastic clamp members 5 and 15 are formed with burrs 54 and 154 for increasing frictions at the contacting surfaces of the clamp pieces 5 and 15 to the walls of the holes 61 and 161 of the lenses 2, thus the clamp members being firmly fitted in the holes of the spectacle lenses. This modification may be also applicable to the bridge 3. In order to increase the friction force, it may be possible to independently interpose a friction member and also possible to adapt other structures.

Furthermore, a calking fixing technique may be adapted in place of the fixing by the spring, the bonding process may be applied to the contact surface, or the fusing process may be also adapted in accordance with a material to be used.

Furthermore, although not shown, the pad legs of the nose pad may be fixed to the bridge or supported by the lens by providing a clamp member like the bridge.

FIGS. 3(A)–11(A) show other modifications of the first elastic clamp member 5 for the end member 4, and FIGS. 3(B)–11(B) show the attachment of the clamps shown in FIGS. 3(A)–11(A) to a lens.

In the following, only the matters different from the structure of FIGS. 1(A)–1(D) are described and like reference numeral with small alphabets are applied to elements or members corresponding to those of FIGS. 1(A)–1(D) and the explanations thereof are now omitted herein.

First, FIG. 3(A) shows a modified first elastic clamp member 5a, in which the second clamp piece 52a of the first elastic clamp member 5a is formed to be linearly straight and a recess 54a is formed to the outer edge 21 of the lens 2. The portion of the outer edge 21 corresponding to this recess 54a of the second clamp piece 52a is formed with a protrusion 63a which is to be engaged with the recess 54a for firmly positioning the clamp piece 52a. In the illustrated embodiment, the protrusion 64a is formed to a groove 62a of the lens 2 so as to provide a sharp edge portion. The first clamp piece 51a is parallel to the second clamp piece 52a with each other. As the positioning means, different from the above, the calking of the front end of the first clamp piece 51a may be adapted or a stopper may be applied.

Further, in place of the formation of the protrusion 63a, as shown in FIG. 3C, a flexible wire-like member 24 such as nylon wire is engaged with a groove formed entirely to the outer periphery of the lens 2, it is possible to mount a decoration member by utilizing the flexible wire-like member 24.

The modifications represented by FIGS. 4(A)–5(A) have substantially the same structure for the positioning of the first elastic clamp member.

Figure 4A:
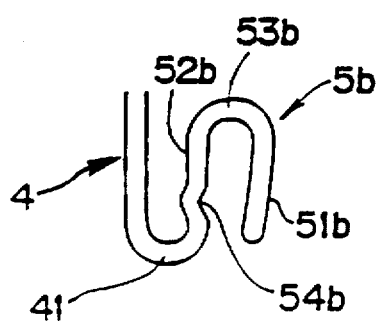
Figure 4B:
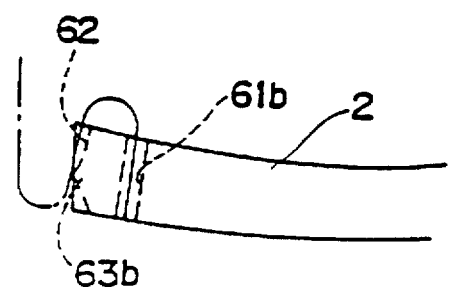

Namely, in FIG. 4(A), the first elastic clamp member 5b has a first clamp piece 51b which extends linearly with slight inward inclination towards a second clamp piece 52b to narrow a distance at front ends between the first and second clamp pieces 51b and 52b for ensuring further firm engagement of the clamp member. A hole 61b formed to the lens 3 for the insertion of the first clamp piece 51b has a tapered wall having a like inclination.

In FIG. 5(A), a first elastic clamp member 5c has a second clamp piece 52c provided with protrusions 55c and 55c between which a recess 54c is formed. This embodiment is particularly suitable for a lens having a relatively large thickness (mainly in the case of concave lens) and in such case, two holes 64c and 64c will be formed to the outer edge of the lens 2 at portions suitable for the fitting of two protrusions 55c and 55c of the second clamp piece 52c, thus firmly clamping the lens.

On the other hand, in the case of the lens 2 having a relatively thin thickness (mainly in the case of convex lens), the lens 2 is fitted into the recess 54c of the second clamp piece 52c with front and rear edge portions of the lens being clamped by the protrusions 55c and 55c, thus increasing the clamping force.

Figure 6A:
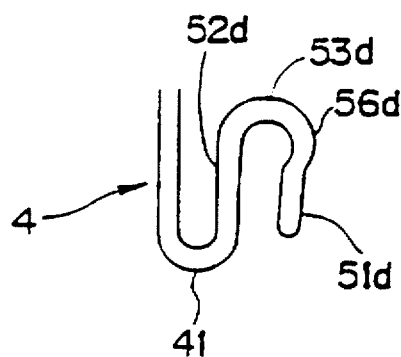
Figure 6B:
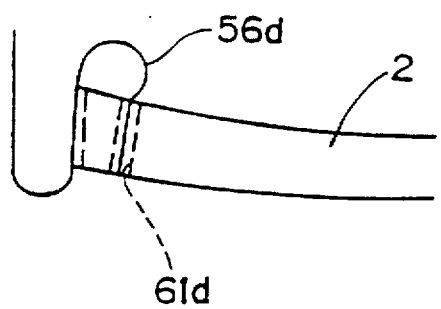

A first elastic clamp member 5d of FIG. 6(A) has a first clamp piece 51d provided at its root portion with a protrusion 56d for achieving firm engagement with the edge portion of the lens 2 and preventing the lens 2 from being moved inside the first elastic clamp member 5d. Furthermore, likely the embodiment of FIG. 4, the first clamp piece 51d has an inclination towards the second clamp piece 52d to reduce an opening distance therebetween to apply a force to the lens 2 rearward, thus firmly clamping the lens 2 between the protrusion 56d and the front end portion of the first clamp piece 51d.

Figure 7A:
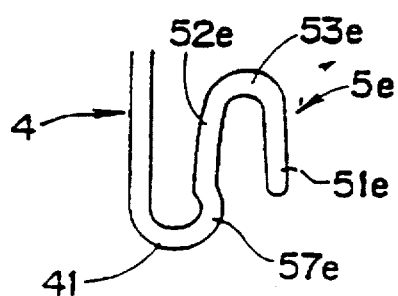
Figure 7B:
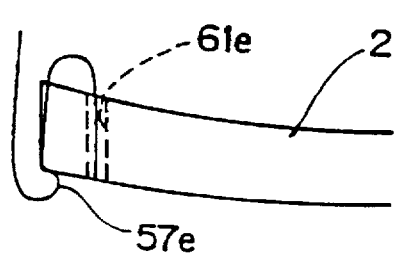

In the embodiment of FIG. 7(A), reversely to that of FIG. 6(A), a protrusion 57d is formed to a root portion of a second clamp piece 52e contacting the outer edge 21 of the lens 2 on the side of the first clamp piece 51e so that the protrusion 57e is engaged with the lens 2.

A distance between the first and second clamp pieces 51e and 52e has inclination widening in a direction toward an opening end side, and accordingly, when the first elastic clamp member 5e is inserted into the hole 61 of the lens 2, a force pressing the lens 2 forward is applied and the lens 2 is thus engaged with the protrusion 57e, thereby achieving the firm clamping of the lens 2.

Figure 8A:
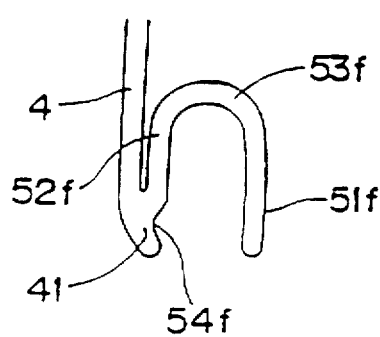
Figure 8B:
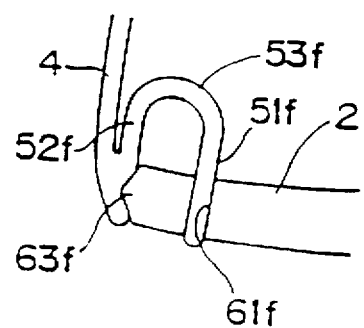
Figure 9A:
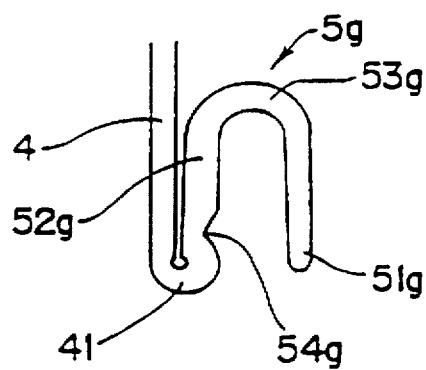

In the embodiments of FIGS. 8(A) and 9(A), first elastic clamp members 5f and 5g respectively having second clamp pieces 52f and 52g, contacting the outer edge of the lens 21, which are provided with recesses 54f and 54g into which the lens 2 is fitted and fixed. The side surface of the lens 2 is formed with protrusion 63f or 63g which fits into the recess 54f or 54g. In these embodiments, the distance between the end member 4 and the first clamp piece 51f or 51g is made smaller than that between the first clamp piece 51f(51g) and the second clamp piece 52f (52g) to reduce the outward extension of the end member 4 with respect to the lens 2.

Figure 9B:
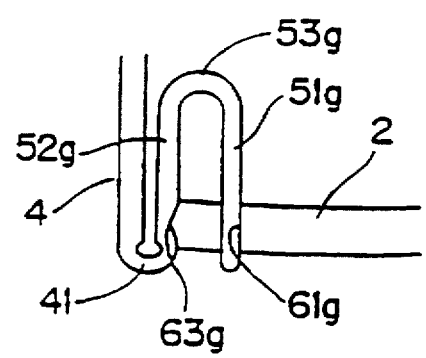
Figure 10A:
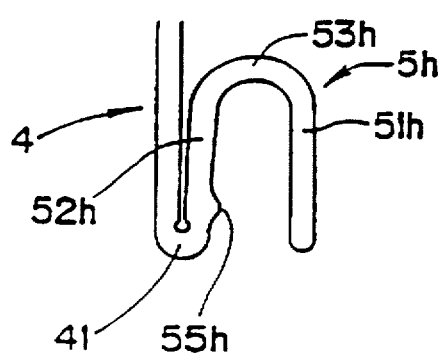
Figure 10B:
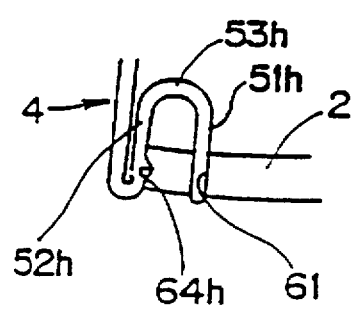

In the embodiment of FIG. 10(A), reversely to that of FIG. 9, a first elastic clamp member 5h is provided with a protrusion 55h to a second clamp piece 52h contacting the outer edge 21 of the lens 2 and a recess 64 into which this protrusion 55h is fitted is formed to the edge of the lens 2. In this embodiment, likely in the embodiments of FIGS. 8 and 9, the distance between the end member 4 and the first clamp piece 51h is made smaller than that between the first clamp piece 51h and the second clamp piece 52h to reduce the outward extension of the end member 4 with respect to the lens 2.

Figure 11A:
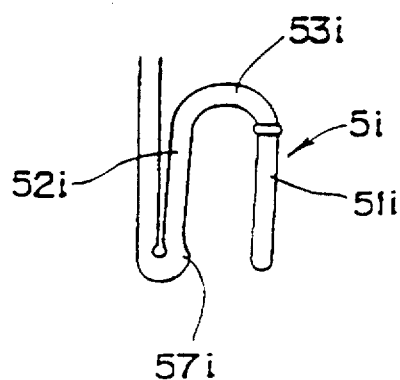
Figure 11B:
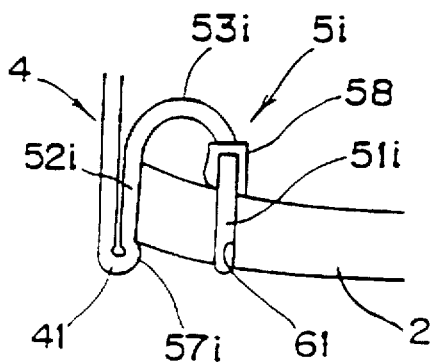

The first elastic clamp member 5i of the embodiment of FIG. 11(A) is an alternation of the embodiment of FIG. 7(A), in which a fitting piece 58i such as rubber or silicon material is applied to a first clamp piece 51i which is to be inserted into the hole 61 of the lens 2 and other structure is substantially the same as that of FIG. 7(A) and the lens 2 is firmly fixed to the clamp member by forcing forward the lens 2 through the engagement between the lens 2 and the protrusion 57i of the second clamp piece 52i.

In this embodiment, the distance between the end member 4 and the first clamp piece 51i is made smaller than that between the first clamp piece 51i and the second clamp piece 52i to reduce the outward extension of the end member 4 with respect to the lens 2.

The embodiment of FIG. 12(A) shows an example of a first elastic clamp member 5j which is provided with a function as a hinge.

Namely, this embodiment is a type in which the first elastic clamp member 5j clamps the lens 2 from the rear side thereof and front end portions of first and second clamp pieces 51j and 52j are opened and rear end portions thereof are connected through a connecting portion 53j to which is formed a pin hole 72 into which a hinge pin 71 is directly inserted. A recess 54j is formed to a portion of the second clamp piece contacting the outer edge 21 of the lens 2 to thereby increase the fastening force of the lens. A sharp protrusion 63j is formed to the edge portion of the lens 2.

The embodiment of FIG. 13(A) is an alternation of the hinge portion of the embodiment of FIG. 12(A), in which a projecting piece 73 is formed to a connecting portion 53k of first and second clamp pieces 51k and 52k.

Figure 14A:
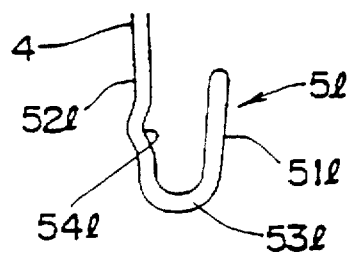
Figure 14B:
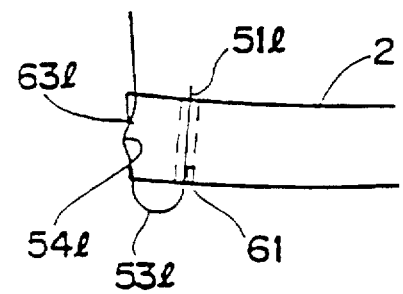

In the embodiment of FIG. 14(A), a U-shaped first elastic clamp member 5l clamps the lens 2 from the forward side thereof as shown in FIG. 14(B). A recess 51*l*, is formed to a portion contacting the outer edge 21 of the lens 2 to thereby increase the fixing force of the lens 2. A sharp protrusion 63*l* is formed to the edge portion of the lens 2.

Figure 15A:
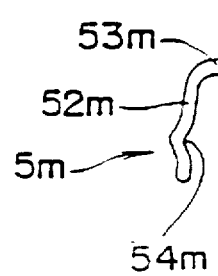
Figure 15B:
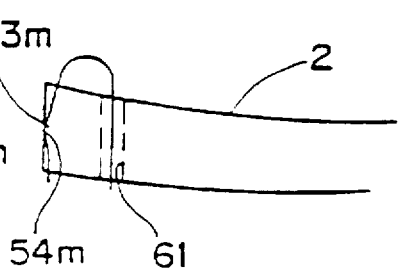

The embodiment of FIG. 15(A) has a structure in which a temple is positioned on an imaginary extension line of the hole 61 of the lens 2 and a U-shaped first elastic member 5*m* is inserted into the hole 61 of the lens 2 from the rear side of the lens 2 to thereby firmly fix the lens 2 as shown in FIG. 15(B).

A recess 54*m* is formed to a portion of a second clamp piece 52*m* of this first elastic clamp member 5*m* contacting the edge portion of the lens 2 and a sharp protrusion 63*m* is formed to the edge portion of the lens 2 to thereby achieve firm engagement of the lens 2.

FIGS. 16(A) to 18(A) represent further embodiments of the first elastic clamp member.

Figure 16A:
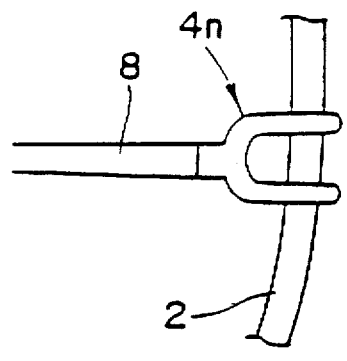
Figure 16B:
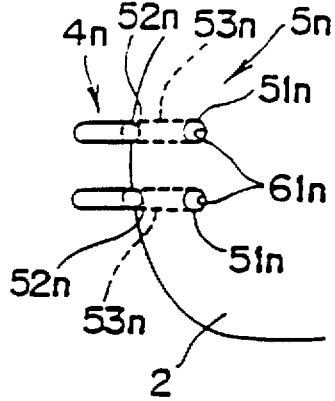

FIG. 16(A) shows a type in which first elastic clamp members 5*n* are formed to forked end portions of a forked end member 4*n* and two holes 61*n* and 61*n* are formed to the lens 2 into which first clamp pieces 51*n* and 51*n* of the forked end portions of the end member 4*n* are fitted. According to this embodiment, since the lens 2 is clamped between two holes 61 and the forked end member 4*n* at two portions, a strong clamping force is applied, thus stably fixing the lens 2.

Figure 17A:
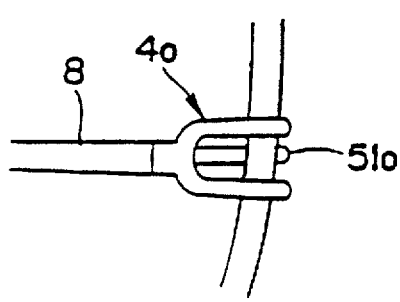
Figure 17B:
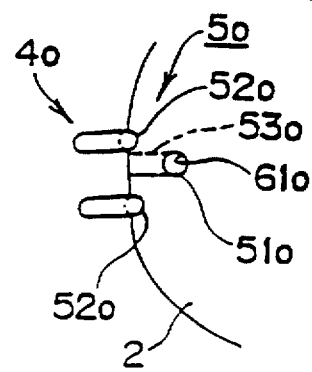

FIG. 17(A) shows a type in which an end member 4*o* is formed with a forked shape and one hole 61*o* is formed to the lens 2, and a first elastic clamp member 5*o* has two second clamp pieces 52*o* connected to the forked end member 4*o* and one first clamp piece 51*o* to be inserted into the hole 61*o*, as shown in FIG. 17(B).

Figure 18A:
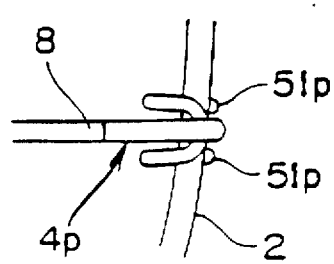
Figure 18B:
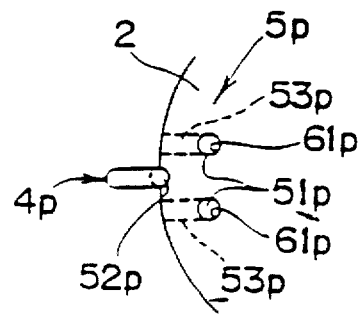

FIG. 18(A) shows a type in which one end member 4*p* is provided and two holes 61*p* and 61*p* are formed to the lens 2, and a first elastic clamp member 5*p* has one second clamp piece 52*p* and two first clamp pieces 51*p* and 51*p* which are to be inserted into the holes 61*p* and 61*p* as shown in FIG. 18(B).

FIGS. 19(A)–19(G) and 20(A)–20(C) are embodiments classified in accordance with the differences of types in consideration of directions of clamping forces.

FIG. 19(A) is an embodiment corresponding to the first elastic clamp member 5*k* of FIG. 13(A) and the clamping force directions of clamp pieces are shown by arrows in FIG. 19A to firmly clamp the lens edge portion from the bilateral direction of the lens 2.

FIGS. 19C and 19D show types in which a lens portion between two holes 61*q* and 61*q* formed to the lens 2 is clamped by a pair of clamp pieces 51*q* and 51*q* which are inserted into the holes 61*q* and 61*q*, respectively, and the clamping force directions are shown by arrows to clamp the lens portion from vertical direction of the lens 2.

Further, as shown in FIGS. 19E and 19F, the holes 61*q* and 61*q* may be formed so as to provide elongated hole shapes.

Furthermore, the clamping force direction may be applied to a mutually attracting direction as shown in FIG. 19G.

Figure 20C:
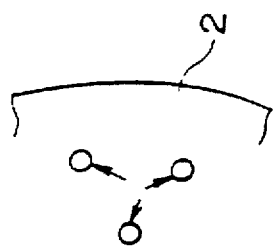
Figure 20B:
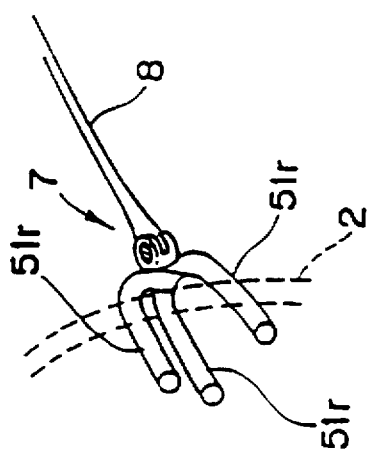
Figure 20A:
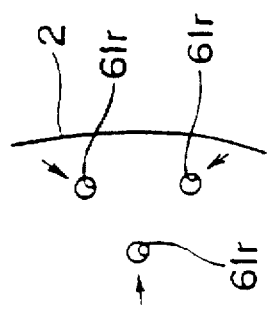

FIGS. 20(A)–20(C) show an embodiment of a type in which the lens 2 is clamped by three clamp pieces 51*r*, 51*r* and 51*r* of a first elastic clamp member 5*r*. In the illustrated embodiment, the clamp pieces 51*r* are inserted into three holes 61*r* formed to the lens 2, but it is of course possible to insert one or two clamp pieces 51*r* into one or two holes 61*r* and to engage other one or two clamp pieces 51*r* with the edge portion of the lens 2. The clamping forces may be applied in attracting directions as shown in FIG. 20A or in opposing directions as shown in FIG. 20C.

FIGS. 21(D)–21(F) shows various alternations of shapes of holes to be formed to the lens 2 for clamp members shown in FIGS. 21(A)–21(C), in which FIG. 21(D) shows an example of square hole 61*s*, FIG. 21(E) shows an example of rectangular hole 61*t* and FIG. 21(F) shows an example of rounded elongated hole 61*u*.

The above embodiments were described with reference to spectacle parts of the end member, the bridge and the hinge, but not limited to them and these embodiments will be applicable to a structure to which the temple is directly attached or a structure attached to a nose pad of the spectacle.

Possibility of Industrial Usage

According to the present invention, a clamp means is provided for clamping a lens, so that it is not necessary to form a large hole as in a conventional art for fitting a conventional elastic fitting portion, thus eliminating a limitation on design.

Furthermore, since it is also not it is also not necessary to precisely work the hole, the productivity of the spectacles can be improved.

We claim:

1. Spectacles, comprising:

a pair of lenses;

spectacles parts for supporting the lenses;

a plurality of clamp members for connecting the supporting parts with the lens, each of the plurality of clamp members including a lens contacting portion; and means formed on the lens contacting surface of said clamp member for increasing friction resistance between the lens contacting portion and respective lens surfaces.

2. Spectacles according to claim 1, wherein said friction resistance increasing means comprises a coarse surface of at least one of contacting surfaces of the lens contacting portion of the clamp member and the respective lens surfaces.

3. Spectacles according to claim 1, wherein said friction resistance increasing means comprises an irregular surface of at least one of the contacting surfaces of the lens contacting portion of the clamp member and the respective lens surfaces.

4. Spectacles according to the claim 1, wherein said friction resistance increasing means comprised friction imparting means disposed between the lens contacting portion of the clamp member and the lens.

5. Spectacles according to claim 1, wherein a force buffer means for buffering a force transferred from a spectacle part to the lens is disposed between a clamp member and the spectacle part.

6. Spectacles according to claim 1, where the clamp member is provided with a plurality of clamp pieces, at least one of the clamp pieces is engaged with a clamping force receiving portion of the lens and other clamp pieces are engaged with portions other than the clamping force receiving portion of the lens to thereby support the lenses.

7. Spectacles according to claim 6, wherein the lens is clamped by a first clamp piece engaging the clamping force receiving portion, and a second clamp piece engaging an edge portion of the lens.

8. Spectacles according to claim 7, wherein a groove is formed in the edge portion of the lens to be engaged with a second clamp piece.

9. Spectacles according to claim 7, wherein the plurality of clamp pieces engage a plurality of corresponding clamping force receiving portions of the lens to clamp a lens portion between the clamping force receiving portions.

10. Spectacles according to claim 7, wherein the clamping force receiving portion is a hole into which the clamp piece is inserted and fitted.

11. Spectacles according to claim 7, further comprising a clamp piece positioning means.

12. Spectacles according to claim 11, wherein the clamp member comprises a pair of clamp pieces connected at one ends thereof so as to provide substantially U-shape, with other ends being opening a forward direction of the lens and engaged with the lens from a rear side of the lens at a time of wearing the spectacles.

13. Spectacles according to claim 11, wherein the clamp member comprises a pair of clamp pieces connected at one ends thereof so as to provide substantially U-shape, with other ends being opened in a rearward direction of the lens and engaged with tile lens from a front side of the lens at a time of wearing the spectacle.

14. Spectacles according to claim 6, wherein at least one of the clamp pieces has a springy elastic property in a clamping direction.

15. Spectacles according to claim 1, wherein one of the spectacles parts is an end member.

16. Spectacles according to claim 1, wherein one of the spectacles part is a temple.

17. Spectacles according to claim 1, wherein one of the spectacle parts is a bridge.

18. Spectacles according to claim 1, wherein one of the spectacles parts is a pad leg.

19. Spectacles according to claim 1, wherein one of the spectacle parts is a hinge.

20. Spectacles, comprising:

a pair of lenses;

spectacles parts for supporting the lenses; and a plurality of clamp members for connecting the supporting parts with the lenses, wherein each of the pair of lenses has a through-hole and a groove formed in an outer periphery of the lens in a region associated with the through-hole, the groove having a protruding portion extending in a direction substantially normal to a thickness direction of the lens, and wherein each of the plurality of clamp members has a U-shaped portion formed of a pair of opposite support members forming a lens supporting structure, with one of the pair support members extending through the through-hole of a respective lens and the other of the pair of support members engaging the lens groove, the other of the pair of support members having a recess into which the protruding portion of the groove engages upon attachment of the respective lens to a corresponding spectacles part.

* * * * *